United States Patent
Hall

(10) Patent No.: US 8,357,440 B2
(45) Date of Patent: Jan. 22, 2013

(54) APPARATUS AND METHOD FOR ENHANCED TEAR RESISTANCE PLASTIC SHEETS

(75) Inventor: George M Hall, Colleyville, TX (US)

(73) Assignee: Poly-America, L.P., Grand Prairie, TX (US)

( * ) Notice: Subject to any disclaimer, the term of this patent is extended or adjusted under 35 U.S.C. 154(b) by 84 days.

(21) Appl. No.: 11/771,821

(22) Filed: Jun. 29, 2007

(65) Prior Publication Data

US 2009/0003738 A1    Jan. 1, 2009

(51) Int. Cl.
*B32B 1/02* (2006.01)
*B32B 1/08* (2006.01)

(52) U.S. Cl. ............ 428/35.7; 428/34.1; 428/34.2; 428/35.9; 428/36.9

(58) Field of Classification Search ............ 428/34.1, 428/34.2, 35.7, 35.9, 36.9
See application file for complete search history.

(56) References Cited

U.S. PATENT DOCUMENTS

| | | | | |
|---|---|---|---|---|
| 3,210,234 A | * | 10/1965 | Baskin et al. | 428/163 |
| 3,654,047 A | * | 4/1972 | Berkowitz | 428/179 |
| 3,738,565 A | | 6/1973 | Archiey et al. | |
| 3,832,267 A | * | 8/1974 | Liu | 428/167 |
| 4,076,121 A | * | 2/1978 | Clayton et al. | 206/390 |
| 5,180,621 A | | 1/1993 | Heier et al. | |
| 5,554,093 A | | 9/1996 | Porchia et al. | |
| 5,618,111 A | | 4/1997 | Porchia et al. | |
| 5,882,322 A | * | 3/1999 | Kim et al. | 602/6 |
| 6,299,966 B1 | * | 10/2001 | Bonke et al. | 428/173 |
| 6,824,856 B2 | * | 11/2004 | Jones | 428/172 |
| 2002/0114920 A1 | * | 8/2002 | Scholz et al. | 428/119 |
| 2006/0165960 A1 | | 7/2006 | Rydberg | |

FOREIGN PATENT DOCUMENTS

WO    WO-2006/056017 A1 *    6/2006

OTHER PUBLICATIONS

Glad Trash Bags. Frequently Asked Questions [online]. The Glad Products Ccompany, 1996 [retrieved Sep. 18, 2008]. Retrieved from the Internet:,URL: http:/web.archive.org/web/20060516190210/http://wwwglad.com/faqs/trashbags.php>.

* cited by examiner

*Primary Examiner* — Marc Patterson
(74) *Attorney, Agent, or Firm* — Brandon J. Lee

(57) ABSTRACT

The present invention provides for a plastic sheet, especially one used in the construction of a plastic trash bag, which provides improved tear propagation properties. The plastic sheet has a plurality of protuberances in the plastic sheet, the protuberances defining a first set of substantially parallel curvilinear lines in a first direction, and optionally, a second set of curvilinear lines in a second direction. The plurality of protuberances can be either indentations or protrusions in the plastic sheet, preferably formed through an embossing process. Preferably, the protuberances are circular in shape, but not necessarily uniform, and alternate between indentations and protrusions along the first, and possibly the second, curvilinear lines with the curvilinear lines preferably being wave-shaped.

7 Claims, 3 Drawing Sheets

APPARATUS AND METHOD FOR ENHANCED TEAR RESISTANCE PLASTIC SHEETS

CROSS REFERENCE TO RELATED APPLICATIONS

Not applicable.

FIELD OF THE INVENTION

The present invention relates to products constructed from plastic sheets, in particular plastic bags, the products having indentions and protrusions configured in such a way as to provide enhanced resistance to tear propagation without effectively altering the elasticity of the plastic sheets.

DESCRIPTION OF THE RELATED ART

Plastic bags are utilized throughout the world for refuse collection, storage, and numerous other purposes. Plastic bags are generally manufactured using a blown-film extrusion process which comprises forming a blown-film tube from polyethylene or other polymeric materials, flattening the blown-film tube, and forming a set of seals and/or cuts to the blown-film tube to form a plurality of plastic bags from the blown-film tube.

In manufacturing bags using the blown-film extrusion process, a tubular film is formed with air that blows through the center of the tube as molten plastic is extruded through a die on the extrusion machine. The resulting tubular film is of substantially uniform thickness around the entire circumference of the film. A pair of nip rollers pulls the blown-film up and the film cools as it continues to be pulled upward. As the film cools, it can eventually be flattened and processed into various types of bags or other plastic products.

One method of manufacturing plastic bags is by first providing pairs of closely spaced, parallel transverse seals at predetermined intervals along the length of a flattened blown-film polymeric tube. A transversely extending line of perforations is provided between each pair of closely spaced, parallel seals. These perforations form the sides of the plastic bags. The bottom of the plastic bag is usually formed from the fold of the blown-film tube as it is flattened. Subsequently, another cut is provided along the central, longitudinal axis of the flattened blown-film polymeric tube to form the top openings of these bags.

Plastic bags may also be produced by providing a pair of parallel seals extending transversely at predetermined intervals along the length of a flattened blown-film polymeric tube. A line of perforations extending transversely across the flattened blown-film polymeric tube is introduced between each pair of seals. In this case, each seal forms the bottom of the bag, and another perforation line is introduced at a point somewhere between successive pairs of closely spaced, parallel seals to form the opening, or top, of the bags. These bags are typically larger in capacity, resulting from the bag walls being the entire circumference of the blown-film polymeric tube.

The blown film extrusion process results in bags that generally have a uniform thickness. There is an inherent relationship between the strength and thickness of the plastic bag. Thicker bags have a tendency to be stronger and more resistant to stretching, tearing, and puncture. However, as the thickness of the plastic film is reduced, the bag becomes lighter and less expensive to manufacture. Therefore, it is imperative to provide a balance between a thicker, stronger bag and a lightweight bag that is cheaper, easier to pack, and more practical for everyday use.

One of the limitations in offering thinner bags is their propensity to rip and tear when compared to bags with thicker walls. It is known that plastic bags formed through a blown-film extrusion process offer varying resistance to tear propagation depending on the direction of the tear. In particular, the blown-film polymeric tube is more susceptible to tearing in the machine direction, which is the longitudinal axis of the blown-film polymeric tube, than in the cross direction, which extends across the width of the blown-film polymeric tube, perpendicular to the machine direction. This is primarily due to the molecular orientation of the polymers in the film, a natural result of the blown-film process.

Plastic sheet products, including plastic trash bags, are also susceptible to stretching because of the natural elastic properties of plastics in general, especially bags manufactured from extremely thin blown-film polymeric tube. When an object within a bag forces the walls of the bag to stretch to a point where the bag can no longer resist the force of the object, a tear or puncture forms in the wall of the bag.

One known method attempting to address this problem used in the prior art is to modify the bags so that they controllably stretch in a manner that exceeds their natural elastic properties. In particular, bags are introduced that have a plurality of parallel ridges introduced into the surface of the bag walls to encourage the bag to stretch when an object comes into contact with the bag. Therefore, when a protruding object inside or outside of a plastic bag comes into contact with the walls of a bag having such ridges, it causes the walls to stretch "controllably" in one or more directions. However, while the amount of plastic material in the wall of the bag stays constant, the surface area of the bag increases, causing the thickness of the walls to be significantly reduced. Therefore, even though a tear has not formed in the bag, the structural integrity of the bag has been significantly compromised. As an alternative to "controlled stretching," it would be desirable to produce a plastic bag that offers properties of increased resistance to tear propagation without increased stretching of the plastic bags and without compromising the structural integrity of the bag.

One of the problems with a tear forming in plastic bags, or any other type of puncture introduced in plastic sheeting products, including plastic trash bags, is that even a small tear or puncture has a strong tendency to propagate along the machine direction of the bag, which, as discussed previously, is markedly weaker than the cross-direction and therefore the "path of least resistance." As noted above, bags manufactured with perforations forming the sides of the bags have the weaker machine direction running across the width of the bag, while the stronger cross direction runs from the bottom of the bag to the top of the bag. In such bags, it would be desirable to redirect a tear propagating in the weaker machine direction to turn, at last partially, in the cross-direction, which is stronger and therefore more resistant to tear propagation.

With bags that are manufactured using the entire circumference of the blown-film polymeric tube, the width of the bag is generally the stronger cross direction while the machine direction tends to run in the vertical direction from the top of the bag to the bottom of the bag. Therefore, in these bags, tears have a tendency to propagate in the vertical direction, the weaker machine direction. In these bags, it is desirable to redirect this tear into the horizontal, cross direction of the bag, which is markedly stronger and therefore more resistant to tear propagation than the machine direction. If a redirection of the propagating tear could be reliably accomplished, it would effectively result in increased tear resistance for the bag as a whole.

In other methods known in the art attempting to control tear propagation, a plurality of connected diagonal lines are introduced into the walls of the plastic bag. The diagonal lines are intended to have the effect of redirecting a tear that is normally propagating in the weaker, machine direction to follow one of the diagonal lines. Redirecting the tear in a direction that is oriented at roughly a 45 degree angle to both the machine direction and cross direction of the bag can result in a slightly increased resistance to tear propagation for the bag. However, in the event a tear is propagating in the cross direction, the lines can actually and undesirably encourage the tear to propagate into the diagonal machine direction, which is actually weaker than the cross direction where the tear was previously propagating.

When using diagonal lines in attempting to redirect the propagation of a tear, the diagonal lines are interconnected so that after a short distance each line terminates into another diagonal line running in a perpendicular direction. Ideally, the tear would immediately turn and follow the perpendicular diagonal line. However, in practice, the hard right angle between the two lines rarely results in such redirection, and generally results in a tear that breaks free from the diagonal path because the force is concentrated into the apex formed by the junction angle of the two lines, allowing tearing in the machine direction until it encounters another diagonal line. Therefore, it would be desirable to introduce more gradual transitions and turns in plastic sheet products, such as a plastic bag, to encourage a propagating tear to follow a curved and tortuous path instead of one comprised of diagonal lines.

SUMMARY OF THE INVENTION

The present disclosure introduces a novel way of addressing the problems and issues involved in providing increased resistance to tear propagation without substantially altering the stretching or elastic properties of a plastic bag.

The present disclosure generally relates to the introduction of a plurality of protuberances, namely indentions and protrusions, into a plastic bag, which as previously mentioned is typically formed using a blown-film extrusion process. The plurality of indentions and protrusions are generally circular in shape. The protuberances lack sharp corners, thereby providing increased resistance to any concentration of forces at a single point, resulting in increased tear propagation resistance as more fully discussed with reference to the figures. The protuberances are generally configured so as to be closely spaced to one another with a series of protuberances forming curvilinear rows in at least a first direction across the plastic bag or plastic sheet, and possibly a second, perpendicular direction across the plastic bag or plastic sheet.

Another aspect of the present disclosure is to provide a method of manufacturing plastic film products having increased resistance to tear propagation without substantially altering the stretching properties of the plastic film. In particular, the method entails using a blown-film polymeric tube having a machine direction along the longitudinal axis of the polymeric tube that is less resistant to tear propagation than the cross direction which is perpendicular to the machine direction. After flattening the blown-film polymeric tube, the tube is embossed with a plurality of indentations and protrusions, the plurality of indentations and protrusions defining a plurality of substantially parallel wave-shaped rows extending across the surface of the plastic tube. In some embodiments, the plurality of indentations and protrusions define a plurality of substantially parallel wave-shaped rows extending across the surface of the plastic tube in a second direction.

While the present disclosure is directed primarily toward plastic bags, it is contemplated that novel techniques and structures disclosed herein have uses outside the realm of plastic bags. In particular, other types of plastic sheeting products, including those manufactured using a blown-film extrusion process, may benefit from the novel features discussed herein. This is especially true since the plastic bags of the present invention are essentially constructed from a plastic sheet, albeit one tubular in nature. Therefore, the present disclosure is not limited to the embodiments described herein. The embodiments described herein illustrate the preferred methods and ways of practicing the invention, but these techniques can be applied to other types of plastic sheeting having properties similar to plastic bags by a person having ordinary skill in the art. The claims herein are intended to more fully encompass the scope of invention as contemplated.

BRIEF DESCRIPTION OF THE DRAWINGS

A full and complete understanding of the present disclosure may be obtained by reference to the detailed description of the invention when viewed with reference to the accompanying drawings. The drawings can be briefly described as follows.

DETAILED DESCRIPTION OF THE INVENTION

The present disclosure illustrates embodiments of the present invention. In view of the disclosure of the invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. Furthermore, the appended claims are intended to encompass the invention to the fullest extent possible, but it is fully appreciated that limitations on the use of particular terms is not intended to conclusively limit the scope of protection for a particular application.

Figure 1A:
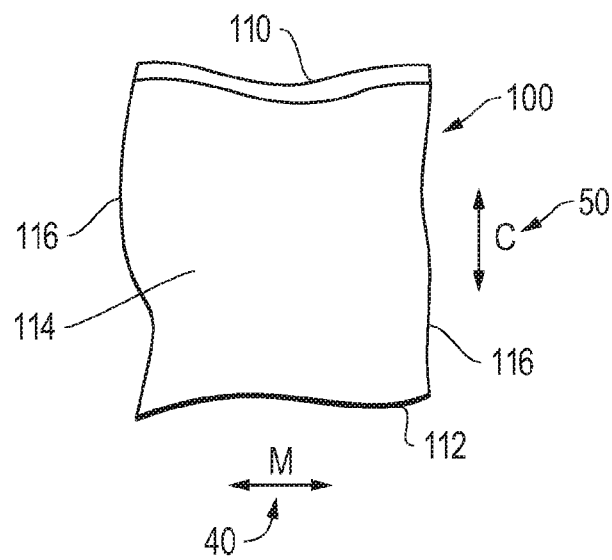
FIG. 1A provides a plan view of a side seal plastic bag as known in the prior art, highlighting the machine direction and cross direction of that plastic bag.

Referring now to FIG. 1A, a perspective view of a side seal plastic bag 100 is provided. The bag has an open top 110, a bottom 112 formed by the folded longitudinal edge of the blown-film tube, and sealed sides 116. The front and back of the bag 100 is comprised of polymeric panels 114. Bags manufactured in this way have a machine direction 40 that runs horizontally across the bag as depicted and a cross direction 50 that runs vertically along the length of the bag. The cross direction 50 of the polymeric panels 114 is markedly stronger than the machine direction 40; therefore, the plastic bag has a tendency to resist tearing in the vertical cross direction 50 to a much greater extent than in the horizontal machine direction 40.

Figure 1B:
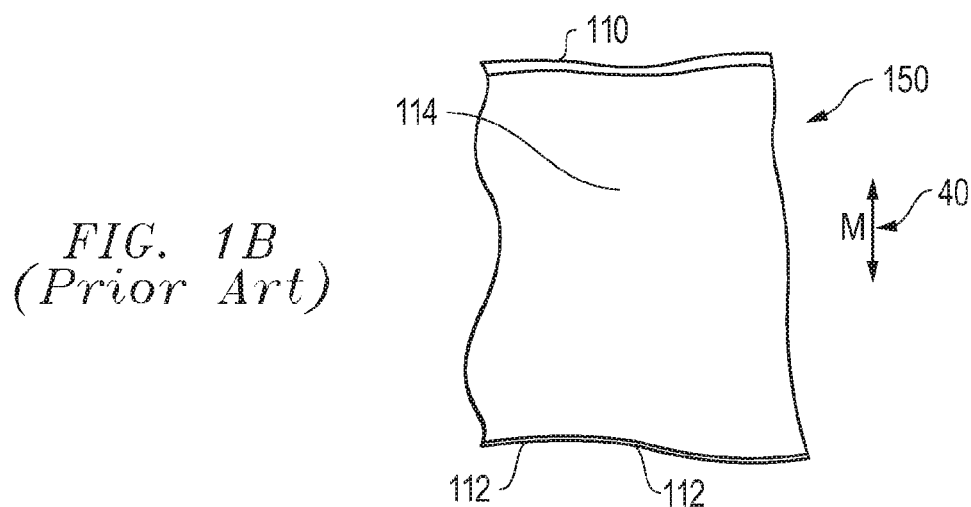
FIG. 1B provides a plan view of a bottom seal plastic bag as known in the prior art, highlighting the machine direction and cross direction of that plastic bag.

Referring now to FIG. 1B, a plan view of a bottom seal plastic bag 150 is provided. The bag 150 has an open top 110 and a single sealed bottom 112. The entire tubular material of a blown-film polymeric tube is used to form this plastic bag as previously described, so there is a single continuous polymeric panel 114 that forms the outer wall of the bag 150. In this type of plastic bag construction, the bags 150 have a machine direction 40 that runs in the vertical direction from the top 110 of the bag 150 to the sealed bottom 112. The cross direction 50 of the bag 150 runs horizontally around the circumference of the bag 150. As with the side seal bags 100, the cross direction 50 of the polymeric panel 114 is markedly stronger, and more tear-resistant, than the machine direction 40. Accordingly, this bag 150 has a tendency to resist tearing in the horizontal cross direction 50 much more so than in the vertical machine direction 40.

Figure 2:
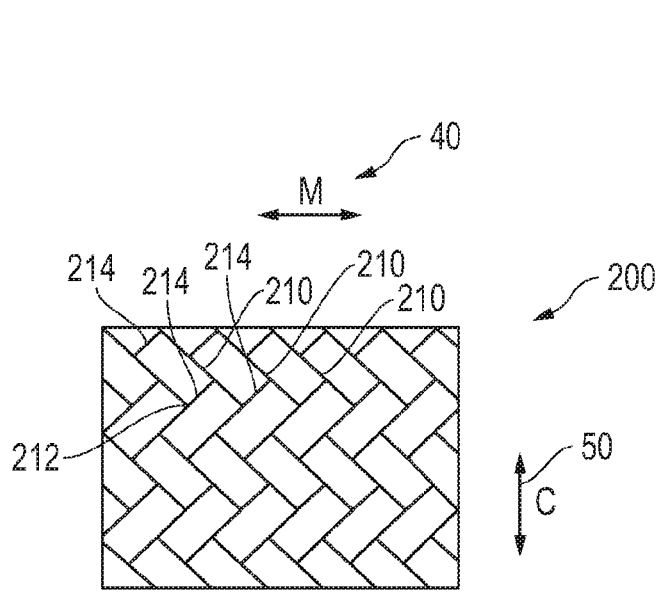
FIG. 2 illustrates a particular pattern used on panels of plastic bags as known in the prior art.

Referring now to FIG. 2, an example of a prior art attempt to resist tear propagation is illustrated. The prior art straight-line system 200 consists of a plurality of first diagonal lines 210 and a plurality of second diagonal lines 214 running in a perpendicular fashion to the plurality of first diagonal lines 210. In this particular illustration the machine direction 40 runs from left to right while the cross direction 50 runs top to bottom. However, because of the symmetry of the prior art straight-line system 200, if the cross direction 50 and machine direction 40 were reversed, the prior art straight-line system 200 would still function in basically the same manner. This can best be seen by rotating FIG. 2 in the clockwise or counter-clockwise directions. Each of the first diagonal lines 210 has a finite length and runs between a pair of perpendicular second diagonal lines 214. In this particular prior art straight-line system 200 the plurality of first diagonal lines 210 and the plurality of second diagonal lines 214 terminate when they intersect, never forming a four-way junction. Instead, each intersection of a first diagonal line 210 with a perpendicular second diagonal line 214 forms a T-shaped intersection 212.

In the prior art straight-line system 200, a tear can be contemplated propagating in the machine direction 40, which in this particular illustration would be a tear running from left to right. Ideally, the tear would follow one of the first diagonal lines 210 or second diagonal lines 214. Assuming it propagates along one of the first diagonal lines 210, when the tear reaches a T-shaped intersection 212 with a perpendicular second diagonal line 214, it is hoped that the tear will continue propagating down the second diagonal line 214. However, in a practical sense, this is not what actually occurs. Instead, the tear breaks free from the diagonal lines and generally proceeds in the weaker machine direction until encountering another diagonal line.

Figure 3A:
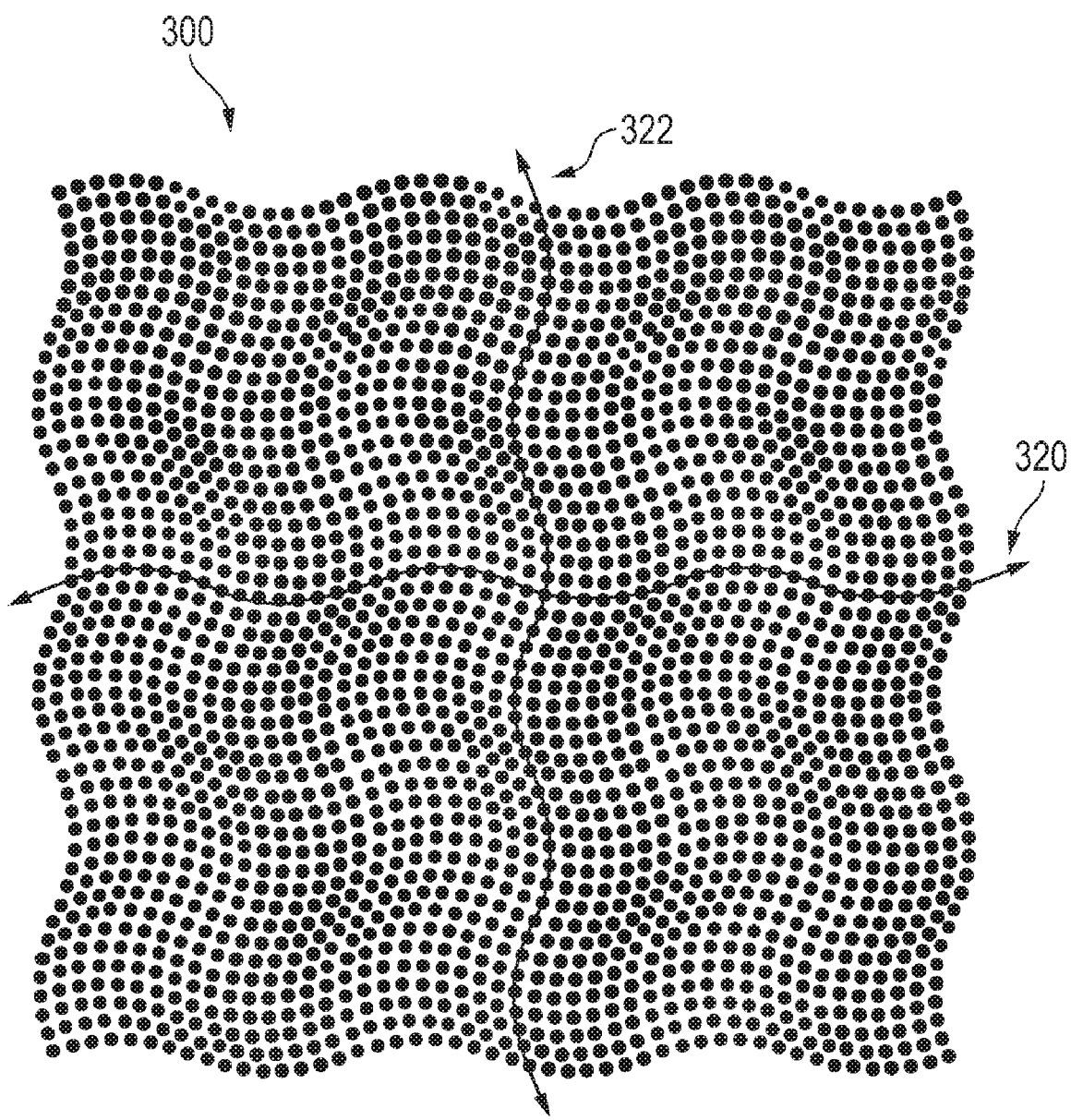
FIG. 3A illustrates a novel tear-resistant pattern according to an embodiment of the present invention.

FIG. 3A illustrates an embodiment of the present invention. In particular, FIG. 3A shows a view of a preferred arrangement 300 of protuberances according to the present invention as applied to a plastic sheeting product, such as a trash bag as depicted in FIG. 1A and FIG. 1B. In this embodiment, a plurality of protuberances, including both indentations and protrusions are provided on the plastic sheet. The protuberances are generally circular in shape, but are not necessarily limited to that shape. Furthermore, the size of the protuberances need not be uniform across the entire area.

The configuration of FIG. 3A also illustrates that the configuration may be arranged to form one or more curvilinear arrangements, such as wave-shaped lines, of protuberances. For example, line 320 illustrates a curvilinear line, in this case generally wave-shaped, of protuberances running in a first direction. Similarly, line 322 illustrates a second curvilinear line, also wave-shaped, defined by the protuberances running in a second direction that is perpendicular to the first line 320. The symmetry of the design allows the pattern to be arranged in almost any particular direction on a plastic sheeting material, such as a trash bag, depending on the needs of a particular product. Furthermore, as will be illustrated in more detail with respect to FIG. 3B, the protuberances can be either indentations or protrusions in the plastic sheeting product. Furthermore, while the protuberances illustrated are circular as depicted, it is not necessary for them to be circular nor uniform in size. In fact, it is contemplated that the protuberances could be in any type of geometric shape with curved sides, straight sides, or some combination of straight and curved sides, and it is also not necessary for all of the protuberances to be the exact same shape. It is further contemplated that configurations wherein two or more curvilinear lines, such as wave-shaped lines, formed by the protuberances are not necessarily perpendicular to one another are clearly possible.

Figure 3B:
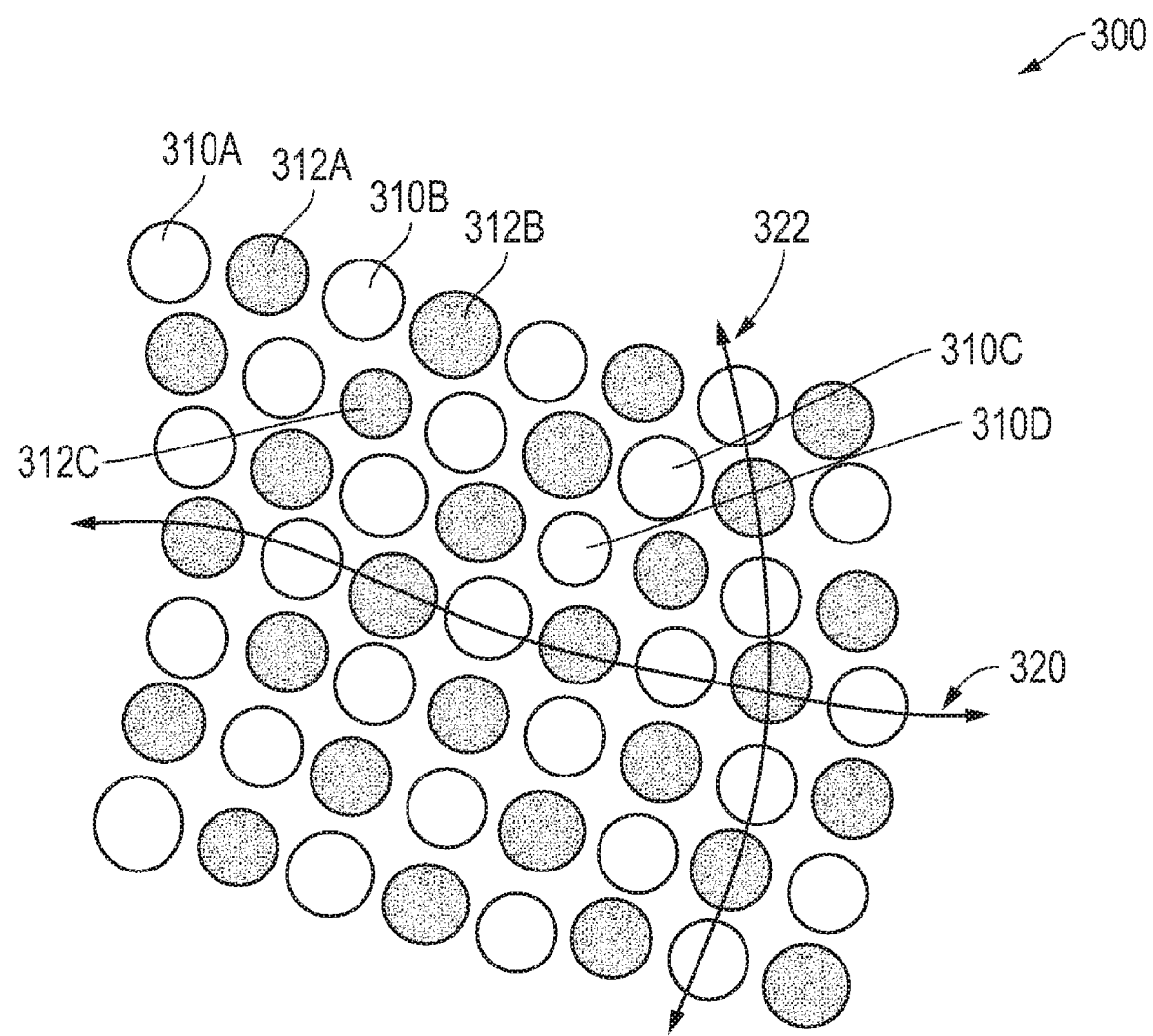
FIG. 3B provides a larger view of the novel tear-resistant pattern according to an embodiment of the present invention.

Referring now to FIG. 3B, a close-up of a portion of the preferred pattern 300 is depicted. In particular, the illustration shows a plurality of protuberances, specifically indentations 310A, 310B, 310C, 310D and protrusions 312A, 312B, 312C. In this close-up view, the first curvilinear line is shown by line 320, while a second close up view is depicted by line 322. The preferred embodiment features an alternating pattern of indentations 310A, 310B and protrusions 312A, 312B. Furthermore, it is contemplated that the protrusions need not be uniform in size, seen with respect to protrusions 312B and 312C nor are the indentations necessarily uniform in size, as depicted by indentations 310C and 310D.

One aspect of the present invention depicted in FIGS. 3A and 3B is that a straight line cannot be drawn from one side of the pattern to the opposite side of the pattern without traveling through at least one of the protuberances in the pattern. This is advantageous because tears have a tendency to propagate in a linear direction, so a tear propagating through the depicted pattern must necessarily intersect with one or more of the protuberances in the pattern. When the tear intersects with the protuberance, it is redirected around the edge of the protuberance resulting in a tortuous path for the propagating tear. As the tear continues to propagate in a generally linear direction away from one protuberance, the tear continues to encounter further protuberances which repeatedly redirect the propagating tear in various directions, including both the machine and cross directions. The end result is a remarkably tortuous path for the propagating tear to follow, resulting in a substantial overall increase in resistance to the tear propagation due to the increased length of the tear path and increased probability that the tear is traveling in the strong cross direction.

A person having skill in the art could reconfigure the disclosed embodiment to achieve varying different configurations that would not depart from the scope of the present invention. Accordingly, based on the embodiments of the present invention that has been illustrated in the accompanying figures and described within this written description, it will be understood that the invention is not limited to the embodiments disclosed herein, but is capable of other rearrangements, modifications, and substitutions without departing from the spirit of the invention.

What is claimed is:

1. A plastic sheet having improved tear propagation properties comprising:
   a plastic sheet having a thickness,
   a plurality of embossed protuberances in the plastic sheet, wherein the plurality of embossed protuberances in the plastic sheet are arranged to define a first set of substantially parallel wave-shaped series of embossed protuberances in a first direction,
wherein each embossed protuberance comprising the plurality of embossed protuberances is distinct, and
wherein each embossed protuberance consists of a circular shape.

2. The plastic sheet of claim 1, wherein the plurality of embossed protuberances comprises at least a first protrusion and a first indentation.

3. The plastic sheet of claim 1, wherein the plurality of embossed protuberances in the plastic sheet defines a second set of substantially parallel wave-shaped series of embossed protuberances in a second direction.

4. The plastic sheet of claim 3, wherein the second direction is substantially perpendicular to the first direction.

5. The plastic sheet of claim 1, wherein the plastic sheet forms the walls of a plastic trash bag.

6. A method for providing improved tear propagation properties in a plastic sheet, comprising the steps of:
providing a plurality of circular, embossed protuberances in a plastic sheet and wherein each embossed protuberance of the plurality of embossed protuberances is distinct,
arranging each embossed protuberance of the plurality of embossed protuberances along a first set of substantially parallel wave-shaped lines in a first direction.

7. The method of claim 6, further comprising the step of:
arranging each embossed protuberance of the plurality of embossed protuberances along a second set of substantially parallel wave-shaped lines in a second direction, wherein the first direction and the second direction are substantially parallel.

* * * * *